United States Patent
Shnaider et al.

(10) Patent No.: US 8,054,905 B2
(45) Date of Patent: Nov. 8, 2011

(54) METHOD OF MEASURING TRANSMIT QUALITY IN A CLOSED LOOP DIVERSITY COMMUNICATION SYSTEM

(75) Inventors: Mikhail Shnaider, Victoria (AU); Quang Nguyen, Victoria (AU)

(73) Assignee: NEC Corporation, Tokyo (JP)

( * ) Notice: Subject to any disclaimer, the term of this patent is extended or adjusted under 35 U.S.C. 154(b) by 838 days.

(21) Appl. No.: 11/989,432

(22) PCT Filed: Jul. 26, 2006

(86) PCT No.: PCT/JP2006/315340
§ 371 (c)(1),
(2), (4) Date: Jan. 25, 2008

(87) PCT Pub. No.: WO2007/013669
PCT Pub. Date: Feb. 1, 2007

(65) Prior Publication Data
US 2009/0086647 A1    Apr. 2, 2009

(30) Foreign Application Priority Data

Jul. 26, 2005  (AU) .................................. 2005903976
Jul. 26, 2005  (AU) .................................. 2005903977
Jun. 5, 2006   (AU) .................................. 2006202384
Jun. 5, 2006   (AU) .................................. 2006202385

(51) Int. Cl.
*H04B 7/02* (2006.01)
*H04L 1/02* (2006.01)

(52) U.S. Cl. ........ 375/267; 375/252; 370/252; 370/319; 455/279.1

(58) Field of Classification Search .................. 375/252, 375/267; 370/252, 319; 455/279.1
See application file for complete search history.

(56) References Cited

U.S. PATENT DOCUMENTS

| 6,795,488 | B1 * | 9/2004 | Iwakiri ......................... 375/148 |
| 6,816,717 | B1 * | 11/2004 | Sipila .......................... 455/277.2 |
| 2003/0148770 | A1 * | 8/2003 | Das et al. ....................... 455/455 |
| 2004/0001472 | A1 | 1/2004 | Kwak et al. |
| 2005/0136840 | A1 * | 6/2005 | Molnar et al. ............... 455/63.1 |
| 2006/0089104 | A1 * | 4/2006 | Kaikkonen et al. ........ 455/67.13 |

FOREIGN PATENT DOCUMENTS

| JP | 2004-40778 | 2/2004 |
| JP | 2005-86492 | 3/2005 |
| JP | 2005-175810 | 6/2005 |

OTHER PUBLICATIONS

3GPP, "3rd Generation Partnership Project; Technical Specification Group Radio Access Network; Physical Layer Procedure", Jun. 2005, 3rd Generation Partnership Project, Release 6.*
3GPP TS 25.214, v6.6.0 (Jun. 2005); Technical Specification Group Radio Access Network; Physical layer procedures (FDD) (Release 6).

* cited by examiner

*Primary Examiner* — Shuwang Liu
*Assistant Examiner* — Sung Ahn
(74) *Attorney, Agent, or Firm* — McGinn Intellectual Property Law Goup, PLLC

(57) ABSTRACT

In a method for determining channel quality information in a high speed packet access communication system with closed loop transmit diversity, power and variance related to a common pilot channel (CPICH) are determined for a rake receiver to obtain a closed loop transmit gain adjustment and to determine the CPICH signal-to-noise ratio. Thereafter, a high speed downlink shared channel (HS-DSCH) signal-to-noise ratio is determined from the CPICH signal-to-noise ratio and is mapped to derive channel quality information.

11 Claims, 8 Drawing Sheets

METHOD OF MEASURING TRANSMIT QUALITY IN A CLOSED LOOP DIVERSITY COMMUNICATION SYSTEM

FIELD OF THE INVENTION

The present invention relates generally to wireless communication systems, and in particular to the determination of channel quality information in a high speed downlink packet access communication system. The present invention has particular application in relation to code division multiple access systems, and it will be convenient to describe the invention in relation to that exemplary application.

BACKGROUND OF THE INVENTION

In existing Code Division Multiple Access (CDMA) systems utilizing closed loop transmit diversity, base stations having multiple antennas use an antenna weight coefficient factor to adjust the phase and/or relative amplitude of signals transmitted from each antenna. In such systems, a mobile station computes a set of optimized antenna coefficients that should be applied at the base station antennas to maximize the mobile received signal power. The mobile station then feeds back to the base station a set of antenna control bits for use by the base station in generating the optimized antenna weights. While receiving high speed downlink packet access channels, the mobile station also feeds back a Channel Quality Indication (CQI) for use by the base station in transmissions scheduling and Transport Format (TF) selection, namely, the transmission power, transport block size, modulation scheme, number of channels to be sent in a time slot. In prior art closed loop transmit diversity systems, the channel quality information is computationally complex and includes a number of inherent inaccuracies.

It would be desirable to provide a method of determining channel quality information in a high speed downlink packet access communication system with closed loop transmit diversity that reduces the need for hardware and/or software resources within a mobile station forming part of the communication system. It would moreover be advantageous to provide a method for determining channel quality information that is improved upon the accuracy of existing methods. It would also be desirable to provide a method of determining channel quality information in a high speed downlink packet access communication system with closed loop transmit diversity that ameliorates or overcomes one or more problems associated with existing channel quality information determining methods, or at least provides a practical alternative thereto.

DISCLOSURE OF THE INVENTION

One aspect of the present invention provides a method of determining channel quality information in a high speed packet access communication system with closed loop transmit diversity, the method including the steps of determining common pilot channel (CPICH) power and variance in each finger of a rake receiver, adjusting the CPICH power in each finger with a closed loop transmit gain adjustment, combining the adjusted CPICH power and variance in all fingers of the rake receiver, determining the CPICH signal-to-noise ratio, determining the high speed downlink shared channel (HS-DSCH) signal-to-noise ratio from the CPICH signal-to-noise ratio, and mapping HS-DSCH signal-to-noise ratio to derive the channel quality information.

The closed loop transmit gain adjustment for each finger may advantageously be calculated from complex channel estimates for Antenna 1 and Antenna 2 and complex antenna weight The closed loop transmit gain adjustment $\Delta G^k$ applied to each finger k may be determined from the following:

$$\Delta G^k = 1 + 2\frac{\bar{\alpha}^k_{1I}\bar{\alpha}^k_{2I}w_{2I} - \bar{\alpha}^k_{1I}\bar{\alpha}^k_{2Q}w_{2Q} + \bar{\alpha}^k_{1Q}\bar{\alpha}^k_{2Q}w_{2I} + \bar{\alpha}^k_{1Q}\bar{\alpha}^k_{2I}w_{2Q}}{|\bar{\alpha}^k_1|^2 + |\bar{\alpha}^k_2|^2}$$

where:
k is the finger index;
w is the complex antenna weight;

$$\bar{\alpha}_1 = \frac{1}{N}\sum_n \alpha_1(n) \text{ and } \bar{\alpha}_2 = \frac{1}{N}\sum_n \alpha_2(n) \text{ with } N = 5; \text{ and}$$

$\alpha_1^k(n)$ and $\alpha_2^k(n)$ denote complex channel estimates for Antenna 1 and Antenna 2.

Another aspect of the invention provides a mobile station for carrying out the above-described methods.

A further specific aspect of the present invention provides a method for determining channel quality information in a high speed packet access communication system with closed loop transmit diversity, the method including the steps of:

determining common pilot channel (CPICH) combined power and variance in a plurality of fingers of a rake receiver, adjusting the CPICH combined power and variance in each finger with a closed loop transmit gain adjustment for each slot, determining the CPICH signal-to-noise ratio, determining the high speed downlink shared channel (HS-DSCH) signal-to-noise ratio from the CPICH signal-to-noise ratio, and mapping HS-DSCH signal-to-noise ratio to derive the channel quality information.

The closed loop transmit gain adjustment for CPICH power may advantageously be calculated from complex channel estimates for Antenna 1 and Antenna 2 and complex antenna weight.

The closed loop transmit gain adjustment for CPICH power $$P_{CPICH\_Rake\_Adj} = P_{CPICH\_Rake}\sum_k (c^{-k} + G^k)$$

may be calculated, for each slot from k-th multipath output, according to:

$$G^k = \frac{1}{10}\sum_{n=1}^{10} 2(\alpha^k_{1I}(n)\alpha^k_{2I}(n)w_{2I} -$$

$$\alpha^k_{1I}(n)\alpha^k_{2Q}(n)w_{2Q} + \alpha^k_{1Q}(n)\alpha^k_{2Q}(n)w_{2I} + \alpha^k_{1Q}(n)\alpha^k_{2I}(n)w_{2Q})$$

and $$c^{-k} = \frac{1}{10}\sum_n (\alpha^k_1(n)\alpha^{k*}_1(n) + \alpha^k_2(n)\alpha^{k*}_2(n))$$

where w$_2$ is the complex antenna weight for the corresponding slot, n is the symbol index in a slot, $\alpha_1^k(n)$ and $\alpha_2^k(n)$ denote complex channel estimates for Antenna 1 and Antenna 2, $\alpha_1^{k*}(n)$ and $\alpha_2^{k*}(n)$ are the complex conjugates of $\alpha_1^k(n)$ and $\alpha_2^k(n)$, and I and Q in subscripts correspond to I and Q components of a complex number.

The closed loop transmit gain adjustment for CPICH variance may be calculated from complex channel estimates for Antenna 1 and Antenna 2 and complex antenna weight.

The closed loop transmit adjustment for CPICH variance $$\sigma_{CPICH\_Rake\_Adj} = \sigma_{CPICH\_Rake} \sum_k c^{-k}$$

may be calculated, for each slot from k-th multipath output, according to $$c^{-k} = \frac{1}{10} \sum_n (\alpha_1^k(n)\alpha_1^{k*}(n) + \alpha_2^k(n)\alpha_2^{k*}(n)).$$

where $\alpha_1^k(n)$ and $\alpha_2^k(n)$ denote complex channel estimates for Antenna 1 and Antenna 2, and $\alpha_1^{k*}(n)$ and $\alpha_2^{k*}(n)$ are the complex conjugate of $\alpha_1^k(n)$ and $\alpha_2^k(n)$ Yet another aspect of the present invention provides a mobile station for carrying out the above-described methods.

The mobile station can include a plurality of multipath processing fingers configured to demodulate at least one channel on which a determination of the channel quality information will be based. The mobile station can also include an antenna weight determination stage configured to generate antenna weights for use as a feedback signal. Further more the multipath processing fingers further include adjustment means configured to adjust the relative power of the multipath signal in accordance with generated antenna weights prior to determination of the channel quality information.

BEST MODE FOR EMBODYING THE INVENTION

The present invention will now be described with reference to the attached drawings, in which the method of determining channel quality information is illustrated in first and second embodiments. It is to be understood however that the described embodiments are exemplary only, and the invention is not to be understood as being limited to the embodiments only.

Figure 1:
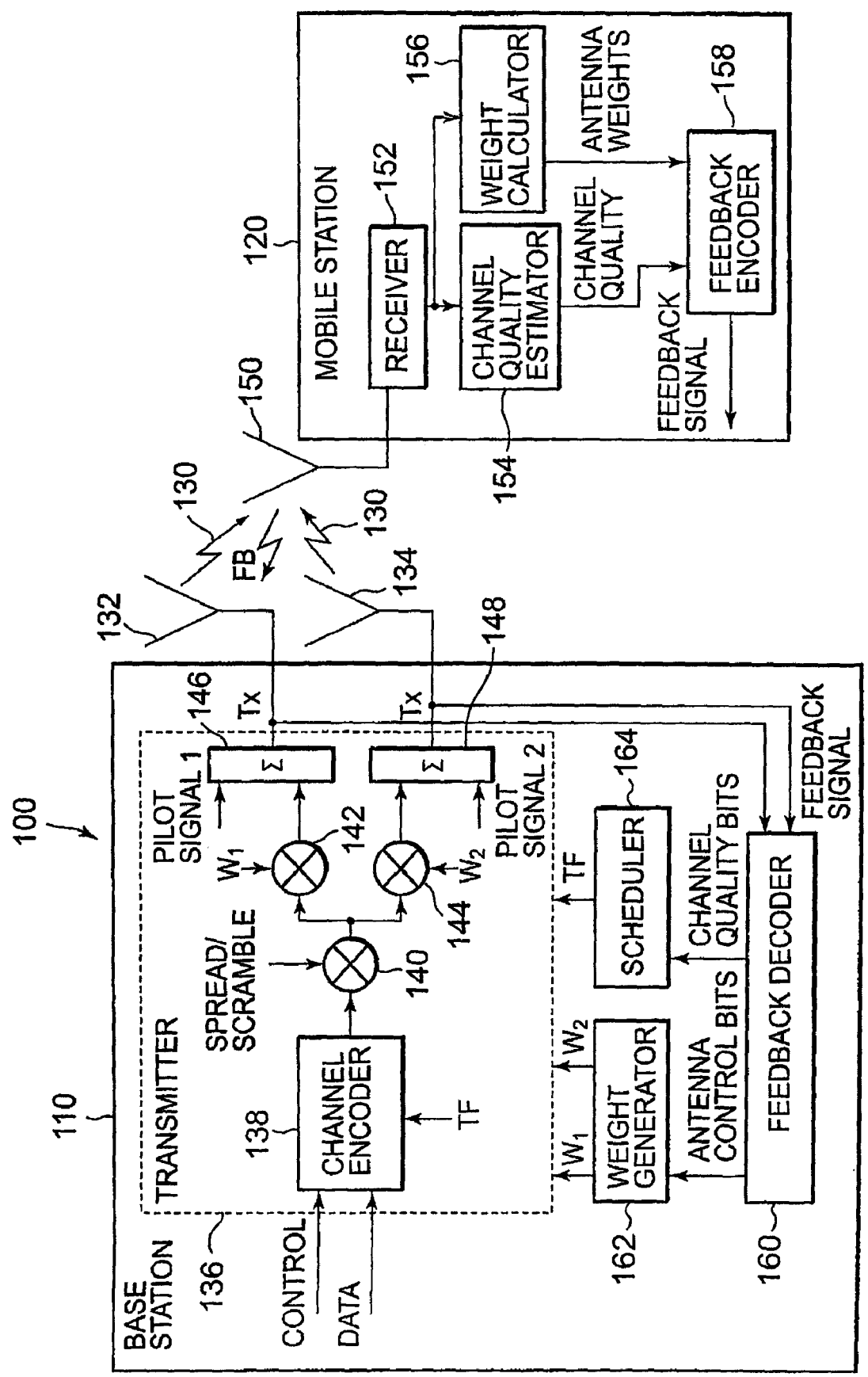
FIG. 1 shows an exemplary wireless communication system including a base station and a mobile station.

Referring now to FIG. 1, there is shown generally the primary elements in a wireless communication system 100 employing closed loop transmit diversity in accordance with the present invention. The wireless communication system 100 includes a base station 110 in communication with a mobile station 120 via a forward downlink channel 130. Whilst only a single base station 110 and mobile station 120 are shown, the wireless communication system 100 may include multiple base stations and mobile stations. The wireless communication system 100 may be capable of operating in accordance with any number of known standards, such as the Universal Mobile Telecommunications System (UMTS) standard, the CDMA 2000 standard and their evolutions, which are hereby incorporated by reference in their entireties.

The base station 110 includes two antennas 132 and 134 for transmitting signals on the forward channel 130. As illustrated, the transmitter portion (may be simply called a transmitter) 136 may include conventional components, such as a channel encoder 138, to receive and encode signals to be transmitted, such as control and data signals. Encoded signals from the encoder 138 are received as input by a spreader multiplier 140, which multiples the received signals by selected spreading codes. Copies of the spread signals from the spread multiplier 140 are received as input by weight multipliers 142 and 144 where the signals are multiplied by antenna weights w$_1$ and w$_2$ in order to adjust the phase and/or amplitude of the spread signals. The weighted signals from the weighted multipliers 142 and 144 are combined with the pilot signals by combiners 146 and 148. Each of the combined signals is transmitted to the mobile station 120 via respective one of the antennas 132 and 134. As illustrated, the mobile station 120 generally includes one or more antennas 150 (only one is shown), a receiver portion 152, a channel quality estimator 154, a weight calculator 156, and a feedback encoder 158.

Figure 2:
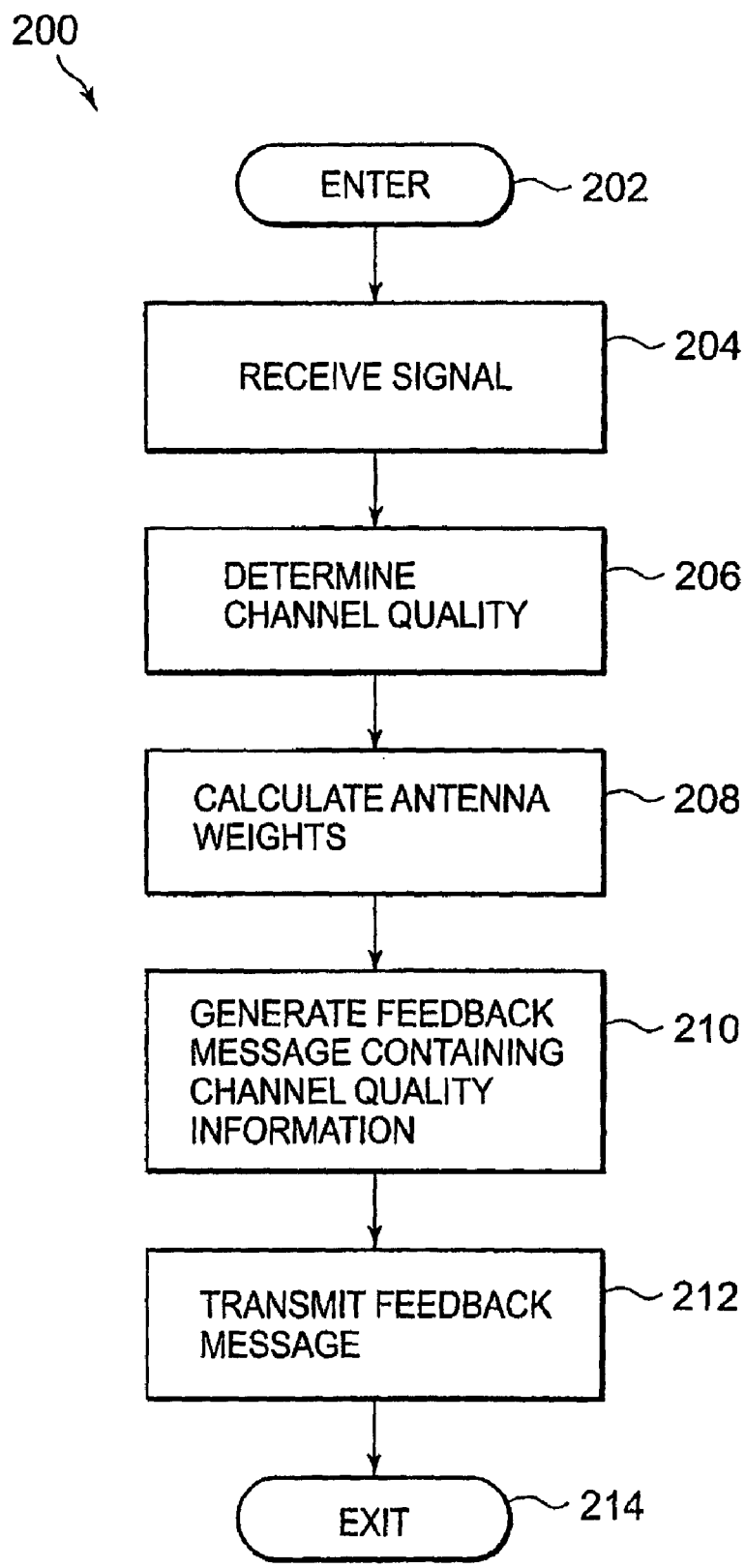
FIG. 2 shows a flow diagram of exemplary operations for channel quality feedback processing that may be performed by the mobile station of FIG. 1.

As seen in FIG. 2, the operations 200 of the communications system 100 shown in FIG. 1 include the transmission, at step 202, by the base station 110 of a signal or signals to the mobile station 120. The operations 200 may be entered in step 202 with every transmission (e.g. within a time slot) from the base station 110, or periodically, for example, every N time slots, where N may correspond to a Transmission Time Interval (TTI) or may be otherwise predetermined, for example, depending upon how often feedback is desired. At step 204, the mobile station 120 receives signals which are transmitted from the base station antennas 132 and 134 via antenna 150 and which may be fed to the receiver 152 for processing (by demodulation, decoding etc.) of the signals using well known techniques.

At step 206, the mobile station 120 determines the channel quality based on the received signals. For example, the received signals may be fed from the receiver 152 to the channel quality estimator 154 to determine channel quality. The channel quality estimator 154 may calculate the channel quality information using well known measures, such as Signal-to-Noise Ratio (SNR). At step 208, the mobile station 120 calculates antenna weights to be applied at the base station, based on the received signals. For example, the received signals may be fed from the receiver 152 to the antenna weight calculator 156 to calculate the antenna weights. The antenna weights may be a matrix of complex valued signals. As previously described, the antenna weights (e.g. w1 and w2) are generally calculated in an effort to maximize the strength of the signals received at the mobile station 120, and may be calculated using well known techniques. Calculation of antenna weights 208 in this particular context is optional and need not be an integral part of the sequence of operations 200.

At step 210, the mobile station generates a feedback message containing Channel Quality Information (CQI) or Antenna Control Information (ACI). For example, the feedback encoder 158 may be generally configured to receive channel quality output from the channel quality estimator 154 and antenna weights from the antenna weight calculator 156 and to generate the feedback message with the CQI or ACI.

At step 212, the mobile station 120 transmits the feedback message to the base station 110 and, at step 214, the operations 200 are terminated, for example, prior to repeating the operations 200 for a subsequent transmission. Whilst not depicted in FIG. 1, it will be understood that the mobile station 120 also includes a transmitter, which may include any combination of well known components.

The base station 110 may receive the feedback message and process the feedback information at a feedback decoder 160 to extract the feedback information (CQI or ACI) used by a scheduler 164 to control future transmissions to the mobile station 120. It should be understood that the uplink signal from the mobile station 120 to the base station 110 is not necessarily received by the same two antennas 132, 134 on the base station 110 that transmitted signals to the mobile station 120.

Figure 3:
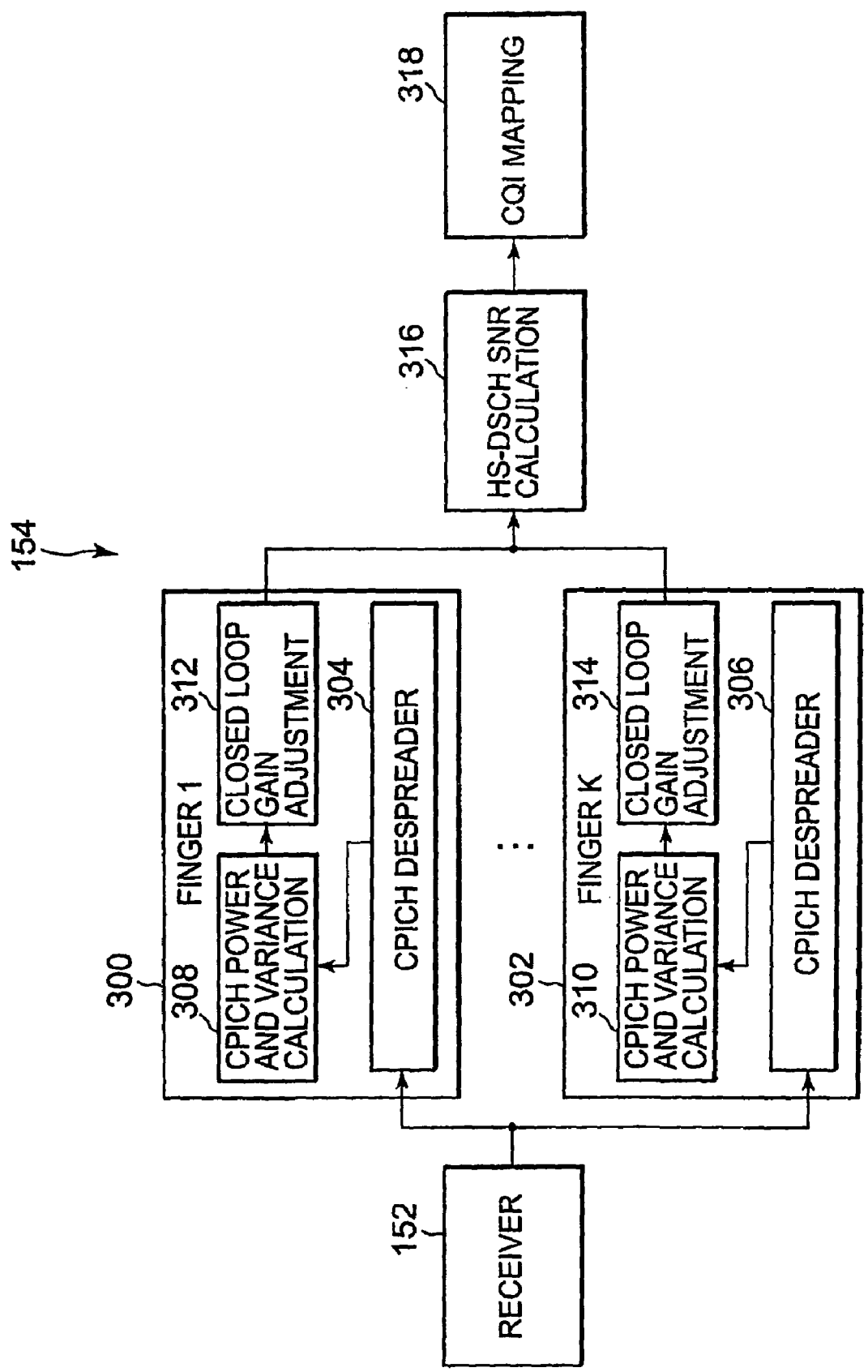
FIG. 3 is a schematic diagram showing various functional components of the mobile station of FIG. 1, according to a first embodiment of the present invention.
Figure 4:
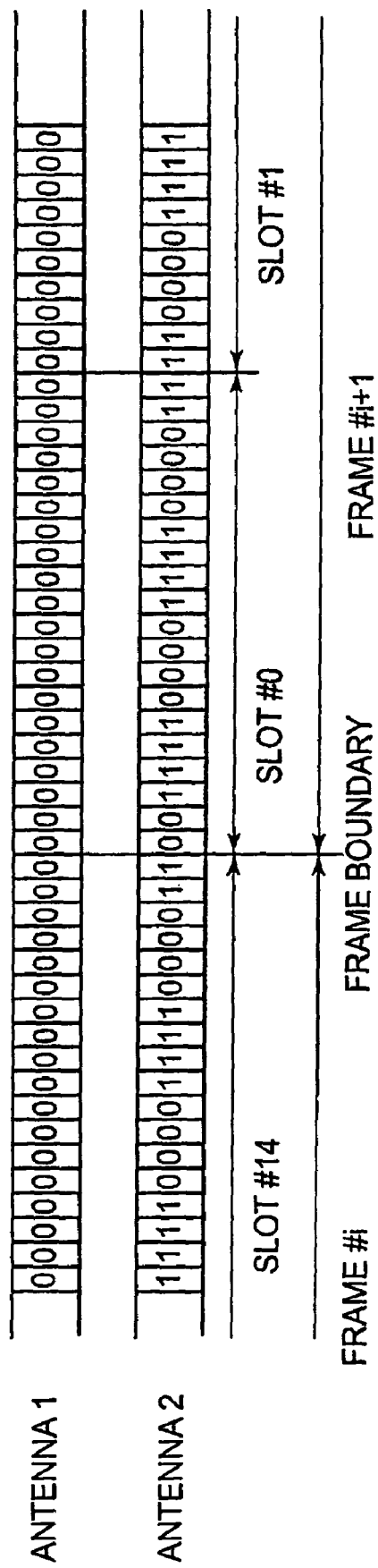
FIG. 4 is a representation of the common pilot channel modulation pattern for the two antennas in the closed loop transmit diversity communication system shown in FIG. 1.

FIG. 3 shows in further detail functional blocks forming part of the channel quality estimator block 154 of the mobile station 120. The receiver 152 demodulates the multipath signal transmitted from antennas 132 and 134. The channel quality estimator 154 includes a despreading finger for each multipath signal component. In FIG. 3, two such despreader fingers 300 and 302 are shown as a rake receiver. Each of the despreader fingers includes a Common Pilot Channel (CPICH) despreading block, respectively, referenced by 304 and 306 for correlating the CPICH signal with a spreading code which is time aligned with the delay of each despreader finger. After despreading, the CPICH modulation patterns for the two antennas 132 and 134, as shown in FIG. 4, are recovered.

The despread CPICH signal is then forwarded to a power and variance calculation block, respectively referenced by 308 and 310 after which a closed loop gain adjustment is applied by a gain adjustment block, respectively referenced by 312 and 314 in the two despreader fingers 300 and 302. Following gain adjustment, the gain adjusted CPICH power and the CPICH variance in each finger are combined and the signal-to-noise ratio of the High Speed Downlink Shared Channel (HS-DSCH) is calculated in the HS-DSCH SNR calculation block 316. The signal-to-noise ratio computed by the block 316 is then relied upon by a Channel Quality Information (CQI) mapping block 318 in order to derive the channel quality information to be included in the feedback signal sent from the mobile station 120 to the base station 100.

Figure 5:
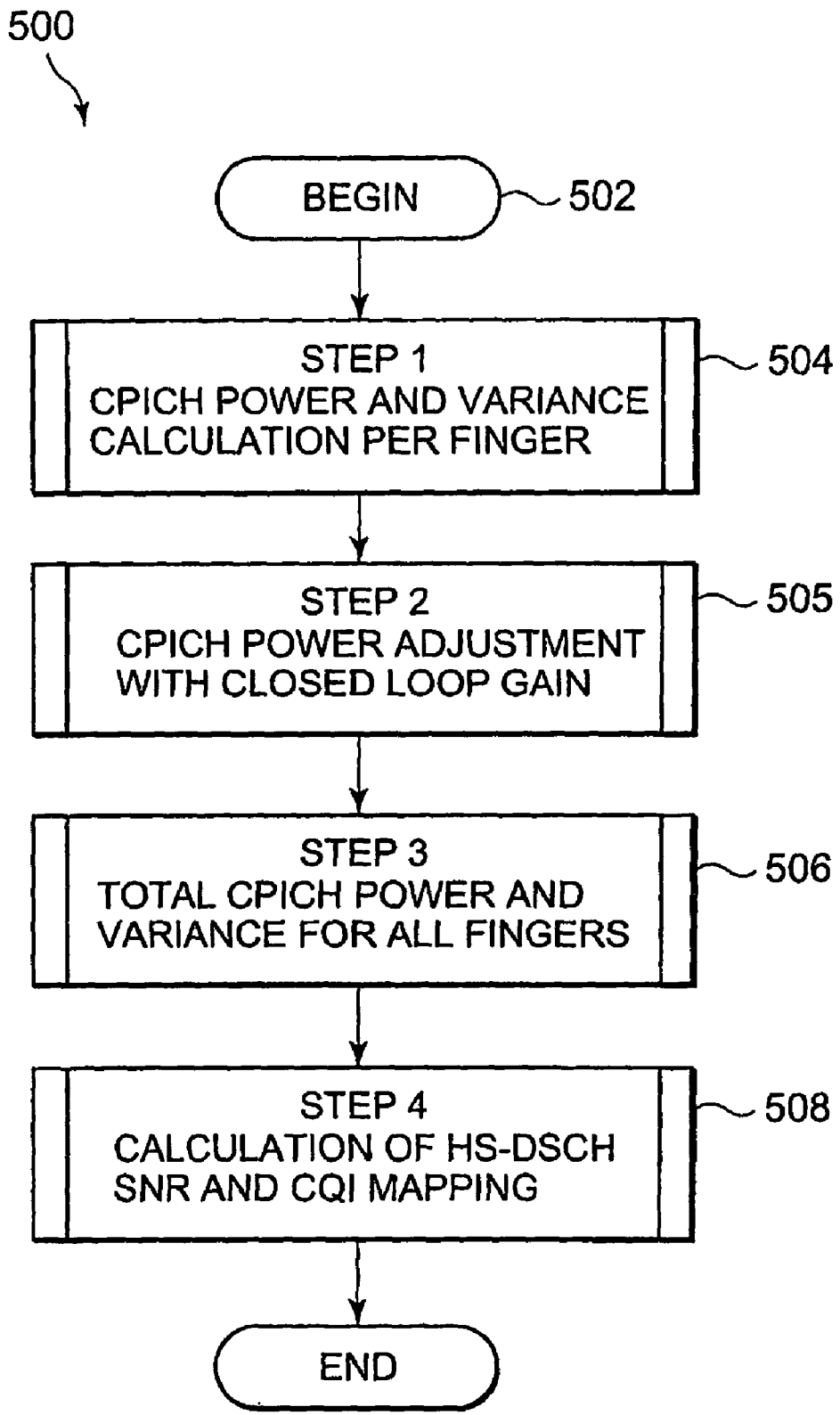
FIG. 5 is a flow diagram of exemplary operations for determining channel quality information that may be performed by the mobile station illustrated in FIG. 3.

From FIG. 3, it can be seen that the calculations of channel quality information provided to the base station 110 by the mobile station 120 is carried out per slot by firstly determining the CPICH power and variance per finger, and then applying an adjustment to the CPICH power with the closed loop transmit gain per finger. The adjusted CPICH power and CPICH variance for all fingers is then totaled. The total CPICH power and variance are then adjusted for HS-DSCH power offset, prior to using a mapping function to derive the CQI bits transmitted to the base station 110. The steps performed by the mobile station 120 to derive the channel quality information is shown in FIG. 5. For each slot, the process 500 shown in FIG. 5 is repeated, commencing with initialization at step 502. At step 504, the power and variance of the CPICH for each finger is calculated by the CPICH power and variance calculation blocks 308 and 310. The power and variance calculations are well known and any one of a number of methods are able to be used. An example of such a calculation is shown below. The calculations may be performed on a slot basis.

1 For each CPICH slot:
Symbols for Antenna 1:

$$X_1^k(n)=(S^k(2n)+S^k(2n+1))/2, \qquad (1)$$

where n from 0 to 4, k is the finger index, $S^k(n)$ is the n-th symbol in a slot from the output of CPICH despreader.

Symbols for Antenna 2:

$$X_2^k(n)=(-1)^{1+n}(S^k(2n)-S^k(2n+1))/2, \qquad (2)$$

where n from 0 to 4, I is the slot number from 0 to 14, k is the finger index.

2. Based on $X_1$ and $X_2$ calculate signal powers and variances for each antenna:

$$sigpow_1^k = \left|\frac{1}{5}\sum_{n=0}^{4} X_1^k(n)\right|^2 \qquad (3)$$

and $$sigpow_2^k = \left|\frac{1}{5}\sum_{n=0}^{4} X_2^k(n)\right|^2 \qquad (4)$$

and $$var_1^k = \frac{1}{5}\sum_{n=0}^{4} |X_1^k(n)|^2 - \left|\frac{1}{5}\sum_{n=0}^{4} X_1^k(n)\right|^2 \qquad (5)$$

$$var_2^k = \frac{1}{5}\sum_{n=0}^{4} |X_2^k(n)|^2 - \left|\frac{1}{5}\sum_{n=0}^{4} X_2^k(n)\right|^2 \qquad (6)$$

3. Total variance per finger is then calculated as the sum of two variances, $$\sigma^k_{CPCH\_Finger}=var_1^k+var_2^k \qquad (7)$$

4. Signal power is calculated over all symbols, $$P^k_{CPICH\_Finger}=sigpow_1^k+sigpow_2^k$$

At step 506, the CPICH power is then adjusted using the closed loop transmit gain for each finger. In this step, the Transmit Adaptive Array (TXAA) gain adjustment is firstly calculated for each finger k according to the following:

$$\Delta G^k = 1 + 2 \frac{\overline{\alpha}_{1I}^k \overline{\alpha}_{2I}^k w_{2I} - \overline{\alpha}_{1I}^k \overline{\alpha}_{2Q}^k w_{2Q} + \overline{\alpha}_{1Q}^k \overline{\alpha}_{2Q}^k w_{2I} + \overline{\alpha}_{1Q}^k \overline{\alpha}_{2I}^k w_{2Q}}{|\overline{\alpha}_1^k|^2 + |\overline{\alpha}_2^k|^2} \quad (8)$$

where k is the finger index and w is the complex antenna weight, $$\overline{\alpha}_1 = \frac{1}{N} \sum_n \alpha_1(n) \text{ and } \overline{\alpha}_2 = \frac{1}{N} \sum_n \alpha_2(n) \quad (9)$$

with N=5, $\alpha_1^k(n)$ and $\alpha_2^k(n)$ denote complex channel estimates for Antenna 1 and Antenna 2 (namely, the two antennas 132 and 134 shown in FIG. 1).

The CPICH power per finger is then adjusted with the calculated closed loop transmit gain adjustment as follows:

$$P^k_{CPIH\_Finger\_Adj} = P^k_{CPICH\_Finger\_Adj} \Delta G^k \quad (10)$$

At step 506, the total adjusted CPICH power and variance for all fingers are calculated. Any known method from existing literature can be used to combine the CPICH power and variance for all fingers. An example of such a known method is set out below.

1. From CPICH power per finger per slot obtained in (10), the total CPICH power per slot for all fingers is $$P_{CPICH\_Finger\_Comb} = \sum_{k=1}^{K} P^k_{CPICH\_Finger\_Adj} \quad (11)$$

where K is the number of fingers

2 From CPICH variance per finger per slot obtained in (7), the total CPICH variance per slot for all fingers is $$\sigma_{CPICH\_Finger\_Comb} = \frac{1}{K} \sum_{k=1}^{K} \sigma^k_{CPICH\_Finger} \quad (12)$$

where K is the number of fingers.

Finally, at step 508, the CPICH signal-to-noise ratio is computed, and the HS-DSCH signal-to-noise ratio is then determined from the CPICH signal-to-noise ratio. The HS-DSCH signal-to-noise ratio is then used to determine the channel quality information.

The HS-DSCH SNR calculation is based on adjusting CPICH SNR with the HS-DSCH power offset and spreading factor gain. The power offset is available from higher layer messages, the spreading gain is fixed for HS-DSCH. The CQI mapping table is used for mapping measured HS-DSCH SNR onto corresponding CQI. The number of entries in the table is 30. The mapping table corresponds to UE category as defined by 3GPP. Each threshold (one per entry) in the table corresponds to a CQI.

One example of the SNR calculation and CQI mapping is shown below:

1. Calculate average over last N slots for adjusted CPICH variance $\sigma_{CPICH\_Finger\_Comb}$ and power $P_{CPICH\_Finger\_Comb}$.

2. An additional low pass filtering could be applied to the averaged values of CPICH power and variance over several past measurements 3. HS-DSCH power calculation is obtained by adjusting the final CPICH power with the HS-DSCH power offset signaled by higher layers 4. HS-DSCH power and variance are mapped onto CQI by means of a mapping table It will be appreciated by those skilled in the art that the block diagrams herein represent conceptual views of illustrative circuitry embodying the principles of the invention. Similarly, it will be appreciated that any flow charts, flow diagrams, pseudo code and the like represent various processes which are able to be substantially represented in computer readable medium and so executed by a computer or processor, whether or not such a computer or processor is explicitly shown. Further various functions of the various elements shown in the Figures may be provided through the use of dedicated hardware as well as hardware capable of executing software in association with appropriate software.

The above described arrangement provides a practical manner in which the mobile station is able to generate channel quality information for transmission to a base station that provides better accuracy than any known method of channel quality information generation, and importantly minimizes the software processing required for the channel quality information processing. Use of computational resources and energy requirements for the calculation of this information is therefore minimized.

Figure 6:
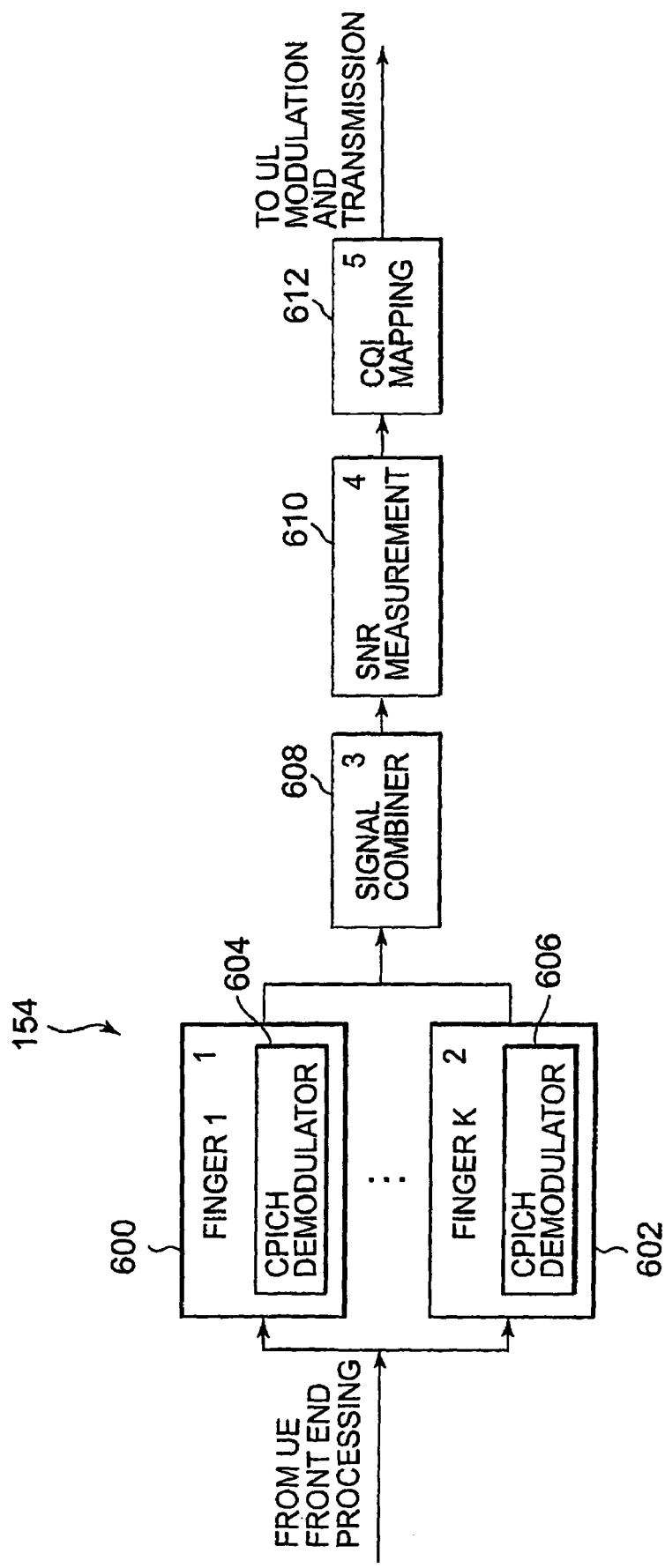
FIG. 6 is a schematic diagram showing various functional components of the mobile station of FIG. 1, according to a second embodiment of the present invention.

FIG. 6 represents a number of elements forming part of the channel quality estimator 154 (FIG. 1) included in the mobile state according to a second embodiment of the present invention. As can be seen from this figure, a signal from the receiver 152 (FIG. 1) is input into multipath processing units or fingers. Examples of the multipath processing units are referenced by 600 and 602. Each processing unit includes a CPICH demodulator, respectively referenced by 604 and 606. The CPICH demodulators in each of the multipath processing units act to demodulate the CPICH in each of the multiple transmission paths received at the mobile station 120. The demodulated CPICH signals are combined in a signal combining unit or a rake combiner 608. The combined signal is then provided as an input to the signal-to-noise ratio measurement block 610. The output of this latter block is provided to the CQI mapping block 612 in order to derive the channel quality information transmitted as a feedback signal from the mobile station 120 to the base station 110.

Figure 7:
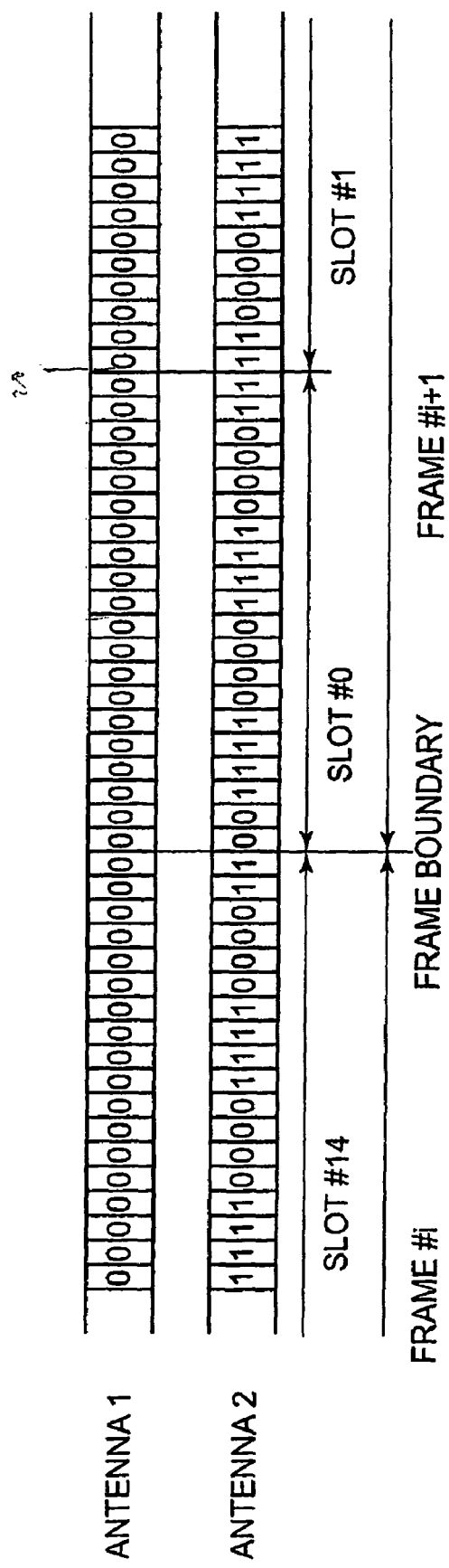
FIG. 7 is another representation of the common pilot channel modulation pattern for the two antennas in the closed loop transmit diversity communication system shown in FIG. 1.
Figure 8:
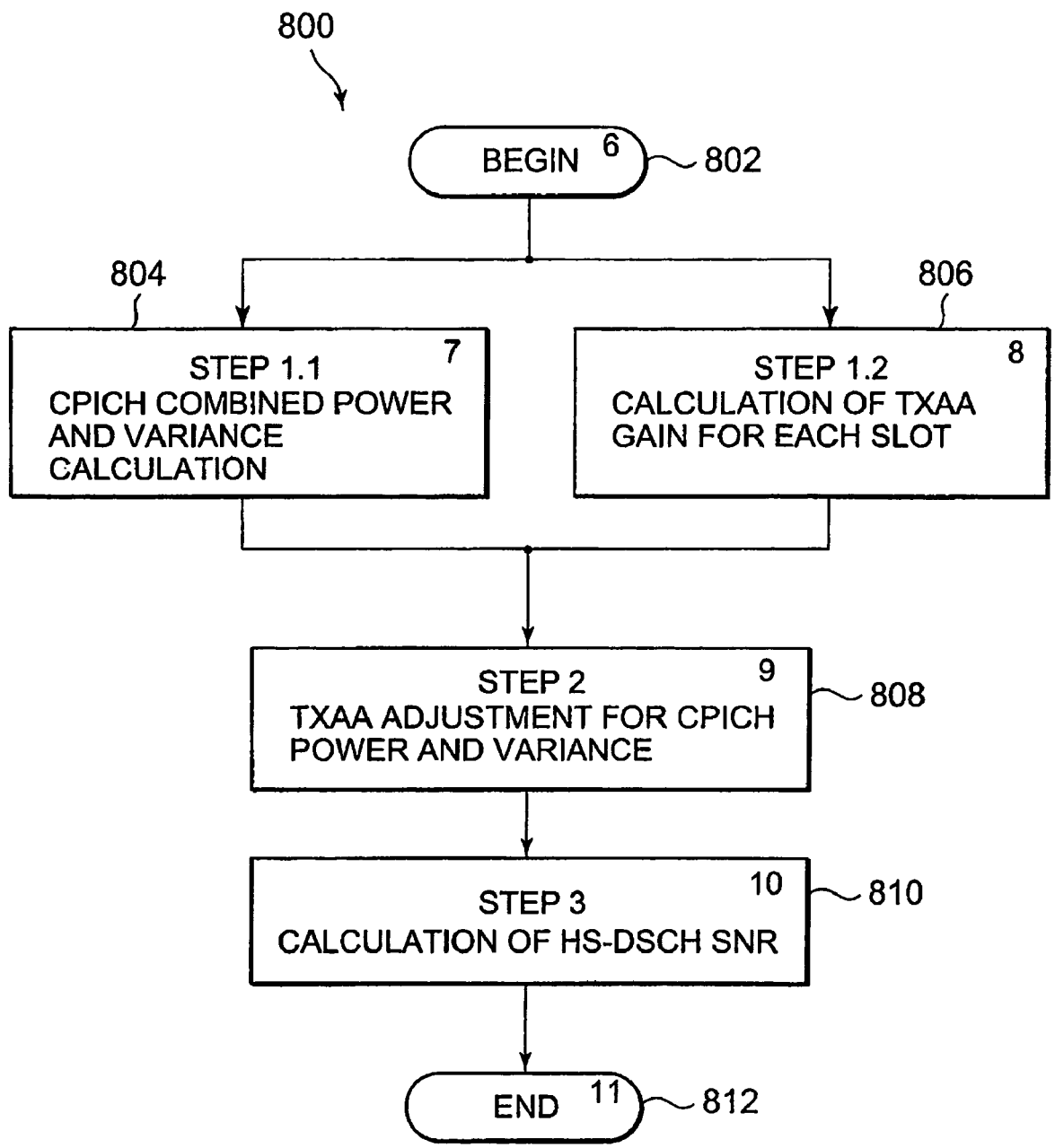
FIG. 8 is a flow diagram of exemplary operations for determining channel quality information that may be performed by the mobile station illustrated in FIG. 6.

FIG. 7 shows the modulation pattern for the CPICH transmitted from the two antennas 132 and 134 in the communication system 100 shown in FIG. 1. FIG. 8 illustrates the manner in which signal-to-noise measurement and subsequent CQI mapping is carried out. As can be seen from FIG. 8, the process 800 commences at each slot and initialization step 802.

At step 804, the CPICH combined power and variance calculation is carried out. At the same time, at step 806, the closed loop transmit gain for each slot is calculated. At step 808, a closed loop transmit gain adjustment for each slot is applied to the CPICH power and variance calculations, whilst at step 810, the signal-to-noise ratio of the HS-DSCH is computed. At the termination of the process, at 812, the signal-to-noise ratio value as calculated is transmitted to the CQI mapping block 612 for calculation of the channel quality bits to be transmitted to the base station 110. At step 804, the calculations are performed on a slot basis. A number of possible methods for performing the CPICH power and variance calculations are known to those skilled in the art from existing literature.

An example of such a calculation is shown below. The calculations may be performed on a slot basis.

Initially, the grouping of the CPICH symbols of each slot into two groups based on the CPICH pattern of Antenna 1 and Antenna 2 is performed.

The following notation is used: $S_{1Rake}$ is used for those CPICH symbols n after Rake combiner that have the same pattern on both antennas, e.g. "00" on Antenna 1 and "00" on Antenna 2. $S_{2Rake}$ is used for those CPICH symbols n after Rake combiner that have different pattern on both antennas, e.g. "00" on Antenna 1 and "11" on Antenna 2. The antenna patterns are shown in FIG. 7.

1. At the output of the Rake combiner, those CPICH symbols corresponding to $S_{1Rake}$ (5 per slot) are grouped depending on CPICH antenna pattern and variance is calculated, $$\text{var}_1 = \frac{1}{5}\sum_{n=1}^{5}|S_{1Rake}(n)|^2 - \left|\frac{1}{5}\sum_{n=1}^{5}S_{1Rake}(n)\right|^2$$

where n denotes symbol number

2. Similarly, CPICH symbols corresponding to $S_{2Rake}$ (5 per slot) are grouped and variance is calculated, $$\text{var}_2 = \frac{1}{5}\sum_{n=1}^{5}|S_{2Rake}(n)|^2 - \left|\frac{1}{5}\sum_{n=1}^{5}S_{2Rake}(n)\right|^2$$

3. Total variance is then calculated as an average of the two variances, $$\sigma_{CPICH\_Rake} = \frac{\text{var}_1 + \text{var}_2}{2}$$

4. Signal power is calculated over all symbols, $$P_{CPICH\_Rake} = \left|\frac{1}{10}\sum_{n=1}^{5}(S_{1Rake}(n) + S_{2Rake}(n))\right|^2$$

The computations in step 806 are carried out for each slot from k-th multipath (finger) output. For example, for 6 fingers the calculations are performed 6 times.

For each slot from k-th multipath output, the signal or rake combiner 608 calculates $$G^k = \frac{1}{10}\sum_{n=1}^{10}2(\alpha_{1I}^k(n)\alpha_{2I}^k(n)w_{2I} - $$
$$\alpha_{1I}^k(n)\alpha_{2Q}^k(n)w_{2Q} + \alpha_{1Q}^k(n)\alpha_{2Q}^k(n)w_{2I} + \alpha_{1Q}^k(n)\alpha_{2I}^k(n)w_{2Q})$$

where $w_2$ is the complex antenna weight for the corresponding slot and n is the symbol index in a slot I and Q in subscripts correspond to I and Q components of a complex number $\alpha_1^k(n)$ and $\alpha_2^k(n)$ denote complex channel estimates for Antenna 1 and Antenna 2 calculated in Finger uDSP.

For each slot from k-th multipath output, the signal combiner also calculates $$\bar{c}^k = \frac{1}{10}\sum_{n}(\alpha_1^k(n)\alpha_1^{k*}(n) + \alpha_2^k(n)\alpha_2^{k*}(n))$$

where $\alpha_1^{k*}(n)$ and $\alpha_2^{k*}(n)$ are the complex conjugates of $\alpha_1^k(n)$ and $\alpha_2^k(n)$.

The calculations in step 808 are carried out on a slot basis and are based on the values of $C^{-k}$ and $G^k$ above.

Once the combined CPICH power $P_{CPICH\_Rake}$ and variance $\sigma_{CPICH\_Rake}$ have been calculated in step 504, a closed loop transmit gain adjustment for both the CPICH power and variance is applied.

The closed loop transmit gain adjustment for CPICH power is given by $$P_{CPICH\_Rake\_Adj} = P_{CPICH\_Rake}\sum_{k}(\bar{c}^k + G^k)$$

where k is the multipath index. The sum is carried out across all multipaths. The closed loop transmit gain adjustment for CPICH variance is given by $$\sigma_{CPICH\_Rake\_Adj} = \sigma_{CPICH\_Rake}\sum_{k}\bar{c}^k$$

where k is the multipath index. Once again, the sum is carried out across all multipaths.

Like in FIG. 5, the HS-DSCH SNR calculation in step 810 is carried out and based on adjusting CPICH SNR with the HS-DSCH power offset and spreading factor gain. Power offset is available from higher layer messages; whilst the spreading gain is fixed for HS-DSCH. The CQI mapping table is used for mapping measured HS-DSCH SNR onto corresponding CQI. The number of entries in the table is 30. The mapping table corresponds to UE category as defined by 3GPP. Each threshold (one per entry) in the table corresponds to a CQI.

One example of the SNR calculation and CQI mapping is shown below:

1. Calculate average over last N slots for adjusted CPICH variance $\sigma_{CPICH\_Rake\_Adj}$ and power $P_{CPICH\_Rake\_Adj}$ 2. An additional low pass filtering could be applied to the averaged values of CPICH power and variance over several past measurements 3. HS-DSCH power calculation is obtained by adjusting the final CPICH power with the HS-DSCH power offset signaled by higher layers.

4. HS-DSCH power and variance is mapped onto CQI by means of a mapping table

Like in the first embodiment, it will be appreciated by those skilled in the art that the block diagrams herein represent conceptual views of illustrative circuitry embodying the principles of the invention. Similarly, it will be appreciated that any flow charts, flow diagrams, pseudo code and the like represent various processes which may be substantially represented in computer readable medium and so executed by a computer or processor, whether or not such computer or processor is explicitly shown. Further, various functions of the various elements shown in the Figures may be provided through use of dedicated hardware as well as hardware capable of executing software in association with appropriate software.

The above-mentioned manner of generating the general quality information advantageously minimizes the amount of hardware resources used by the mobile station to generate that information, and improves upon the accuracy of known techniques for generating channel quality information.

Finally, it will be appreciated that modifications and/or alterations may be made to the above described system and method without departing from the spirit or ambit of the invention as defined in the claims appended hereto. For example, the method according to the present invention may process the CPICH power and variance determined for each finger of the rake receiver in a mobile station to derive the channel quality information.

The invention claimed is:

1. A method, carried out by a mobile station, for determining channel quality information in a high speed packet access communication system with closed loop transmit diversity, the method comprising:
   determining common pilot channel (CPICH) power and variance in each finger of a rake receiver;
   adjusting the CPICH power in each finger with a closed loop transmit gain adjustment;
   combining the adjusted CPICH power and variance in all fingers of the rake receiver;
   determining a CPICH signal-to-noise ratio;
   determining a high speed downlink shared channel (HS-DSCH) signal-to-noise ratio from the CPICH signal-to-noise ratio; and
   mapping the HS-DSCH signal-to-noise ratio to derive the channel quality information,
   wherein the closed loop transmit gain adjustment for each finger is calculated from complex channel estimates for a first antenna and a second antenna complex antenna weight,
   wherein:
   the closed loop transmit gain adjustment $\Delta G^k$ applied to each finger k is determined from the following:

$$\Delta G^k = 1 + 2 \frac{\bar{\alpha}_{1I}^k \bar{\alpha}_{2I}^k w_{2I} - \bar{\alpha}_{1I}^k \bar{\alpha}_{2Q}^k w_{2Q} + \bar{\alpha}_{1Q}^k \bar{\alpha}_{2Q}^k w_{2I} - \bar{\alpha}_{1Q}^k \bar{\alpha}_{2I}^k w_{2Q}}{|\bar{\alpha}_1^k|^2 + |\bar{\alpha}_2^k|^2}$$

where
k is a finger index,
w is the complex antenna weight, $$\bar{\alpha}_1 = \frac{1}{N} \sum_n \alpha_1(n) \text{ and } \bar{\alpha}_2 = \frac{1}{N} \sum_n \alpha_2(n) \text{ with } N = 5; \text{ and}$$

$\alpha_1^k(n)$ and $\alpha_2^k(n)$ denote complex channel estimates for the first antenna and the second antenna.

2. A mobile station forming part of a high speed packet access communication system with closed loop transmit diversity, the mobile station, comprising:
   circuitry for carrying out processing which comprises:
      determining common pilot channel (CPICH) power and variance in each finger of a rake receiver;
      adjusting the CPICH power in each finger with a closed loop transmit gain adjustment;
      combining the adjusted CPICH power and variance in all fingers of the rake receiver;
      determining the CPICH signal-to-noise ratio;
      determining a high speed downlink shared channel (HS-DSCH) signal-to-noise ratio from the CPICH signal-to-noise ratio; and
      mapping the HS-DSCH signal-to-noise ratio to derive the channel quality information,
   wherein:
   the closed loop transmit gain adjustment for each finger is calculated from complex channel estimates for a first antenna and a second antenna complex antenna weight; and
   wherein:
   the closed loop transmit gain adjustment $\Delta G^k$ applied to each finger k is determined from the following:

$$\Delta G^k = 1 + 2 \frac{\bar{\alpha}_{1I}^k \bar{\alpha}_{2I}^k w_{2I} - \bar{\alpha}_{1I}^k \bar{\alpha}_{2Q}^k w_{2Q} + \bar{\alpha}_{1Q}^k \bar{\alpha}_{2Q}^k w_{2I} + \bar{\alpha}_{1Q}^k \bar{\alpha}_{2I}^k w_{2Q}}{|\bar{\alpha}_1^k|^2 + |\bar{\alpha}_2^k|^2}$$

where k is a finger index,
w is the complex antenna weight, $$\bar{\alpha}_1 = \frac{1}{N} \sum_n \alpha_1(n) \text{ and } \bar{\alpha}_2 = \frac{1}{N} \sum_n \alpha_2(n) \text{ with } N = 5; \text{ and}$$

$\alpha_1^k(n)$ and $\alpha_2^k(n)$ denote complex channel estimates for the first antenna and the second antenna.

3. A method, being carried out by a mobile station, for determining channel quality information in a high speed packet access communication system with closed loop transmit diversity, the method comprising:
   determining common pilot channel (CPICH) combined power and variance in a plurality of fingers of a rake receiver;
   adjusting the CPICH combined power and variance in each finger with a closed loop transmit gain adjustment for each slot;
   determining a CPICH signal-to-noise ratio;
   determining a high speed downlink shared channel (HS-DSCH) signal-to-noise ratio from the CPICH signal-to-noise ratio by the mobile station; and
   mapping HS-DSCH signal-to-noise ratio to derive the channel quality information,
   wherein:
   the closed loop transmit rain adjustment for CPICH power is calculated from complex channel estimates for a first antenna and a second antenna and complex antenna weight, and
   wherein:
   the closed loop transmit gain adjustment for CPICH combined power $$P_{CPICH\_Rake\_Adj} = P_{CPICH\_Rake} \sum_k (\bar{c}^{-k} + G^k)$$

is calculated, for each slot from k-th multipath output, according to $$G^k = \frac{1}{10}\sum_{n=1}^{10}(2\alpha_{1I}^k(n)\alpha_{2I}^k(n)w_{2I} -$$

$$\alpha_{1I}^k(n)\alpha_{2Q}^k(n)w_{2Q} + \alpha_{1Q}^k(n)\alpha_{2Q}^k(n)w_{2I} + \alpha_{1Q}^k(n)\alpha_{2I}^k(n)w_{2Q})$$

and $$\overline{c}^{-k} = \frac{1}{10}\sum_n (\alpha_1^k(n)\alpha_1^{k*}(n) + \alpha_2^k(n)\alpha_2^{k*}(n)),$$

where $w_2$ is the complex antenna weight for the corresponding slot, n is a symbol index in a slot, $\alpha_1^k(n)$ and $\alpha_2^k(n)$ denote complex channel estimates for the first antenna and the second antenna, respectively, $\alpha_1^{k*}(n)$ and $\alpha^{k*}(n)$ are complex conjugates of $\alpha_1^k(n)$ and $\alpha_2^k(n)$, and I and Q in subscripts correspond to I and Q components of a complex number.

4. The method according to claim 3, wherein the closed loop transmit gain adjustment for CPICH variance is calculated from complex channel estimates for the first antenna and the second antenna and complex antenna weight.

5. The method according to claim 4, wherein the closed loop transmit adjustment for CPICH variance $$\sigma_{CPICH\_Rake\_Adj} = \sigma_{CPICH\_Rake} \sum_k \overline{c}^{-k}$$

is calculated, for each slot from k-th multipath output, according to $$\overline{c}^{-k} = \frac{1}{10}\sum_n (\alpha_1^k(n)\alpha_1^{k*}(n) + \alpha_2^k(n)\alpha_2^{k*}(n))$$

where
$\alpha_1^k(n)$ and $\alpha_2^k(n)$ denote complex channel estimates for the first antenna and the second antenna, and
$\alpha_1(n)$ and $\alpha_2(n)$ are complex conjugates of $\alpha_1^k(n)$ and $\alpha_2^k(n)$.

6. A mobile station configured to communicate with a high speed packet access communication system with closed loop transmit diversity, the mobile station comprising:
at least one antenna able to receive a signal which includes a plurality of multipath signal components, on which high speed packet access data is transmitted, and a channel quality estimator,
wherein:
the channel quality estimator is configured to determine channel quality information and carries out processing which comprises:
determining common pilot channel (CPICH) combined power and variance in a plurality of fingers of a rake receiver;
adjusting the CPICH combined power and variance in each finger with a closed loop transmit gain adjustment for each slot;
determining a CPICH signal-to-noise ratio;
determining a high speed downlink shared channel (HS-DSCH) signal-to-noise ratio from the CPICH signal-to-noise ratio by the mobile station; and
mapping the HS-DSCH signal-to-noise ratio to derive the channel quality information;

wherein:
the channel quality estimator further comprises:
a rake combiner for calculating the closed loop transmit gain adjustment for CPICH power from complex channel estimates for a first antenna and a second antenna and complex antenna weight; and
wherein:
the closed loop transmit gain adjustment for CPICH combined power $$P_{CPICH\_Rake\_Adj} = P_{CPICH\_Rake} \sum_k (c^{-k} + G^k)$$

is calculated, for each slot from k-th multipath output, according to $$G^k = \frac{1}{10}\sum_{n=1}^{10} 2(\alpha_{1I}^k(n)\alpha_{2I}^k(n)w_{2I} -$$

$$\alpha_{1I}^k(n)\alpha_{2Q}^k(n)w_{2Q} + \alpha_{1Q}^k(n)\alpha_{2Q}^k(n)w_{2I} + \alpha_{1Q}^k(n)\alpha_{2I}^k(n)w_{2Q})$$

and $$c^{-k} = \frac{1}{10}\sum_n (\alpha_1^k(n)\alpha_1^{k*}(n) + \alpha_2^k(n)\alpha_2^{k*}(n))$$

where
$w_2$ is the complex antenna weight for the corresponding slot,
n is a symbol index in a slot,
$\alpha_1^k(n)$ and $\alpha_2^k(n)$ denote complex channel estimates for the first antenna and the second antenna, respectively,
$\alpha_1^{k*}(n)$ and $\alpha_2^{k*}(n)$ are complex conjugates of $\alpha_1^k(n)$ and $\alpha_2^k(n)$, and I and Q in subscripts correspond to I and Q components of a complex number.

7. The mobile station of claim 6 further comprising a plurality of multipath processing fingers configured to demodulate at least one channel on which a determination of the channel quality information will be based.

8. The mobile station of claim 6 further comprising an antenna weight calculator configured to generate antenna weights for use as a feedback signal.

9. The mobile station of claim 6, wherein the multipath processing fingers comprising adjustment means configured to adjust a relative power of the multipath signal components prior to determination of the channel quality information.

10. The mobile station according to claim 6,
wherein:
the channel quality estimator comprises circuitry for calculating the closed loop transmit gain adjustment for CPICH variance from complex channel estimates for the first antenna and the second antenna, and
the closed loop transmit adjustment for CPICH variance $$\sigma_{CPICH\_Rake\_Adj} = \sigma_{CPICH\_Rake} \sum_k c^{-k}$$

is calculated, for each slot from k-th multipath output, according to $$c^{-k} = \frac{1}{10}\sum_n (\alpha_1^k(n)\alpha_1^{k*}(n) + \alpha_2^k(n)\alpha_2^{k*}(n)).$$

where
$\alpha_1^k(n)$ and $\alpha_2^k(n)$ denote complex channel estimates for the first antenna and the second antenna, and
$\alpha_1^{k*}(n)$ and $\alpha_2^{k*}(n)$ are complex conjugates of $\alpha_1^k(n)$ and $\alpha_2^k(n)$.

11. A mobile station configured to communicate with a high speed packet access communication system with closed loop transmit diversity, the mobile station comprising:
    at least one antenna able to receive a signal which includes a plurality of multipath signal components, on which high speed packet access data is transmitted, and a channel quality estimator,
wherein:
    the channel quality estimator is configured to determine channel quality information and carries out processing which comprises:
    determining common pilot channel (CPICH) combined power and variance in a plurality of fingers of a rake receiver;
    adjusting the CPICH combined power and variance in each finger with a closed loop transmit gain adjustment for each slot;
    determining a CPICH signal-to-noise ratio;
    determining a high speed downlink shared channel (HS-DSCH) signal-to-noise ratio from the CPICH signal-to-noise ratio by the mobile station; and
    mapping the HS-DSCH signal-to-noise ratio to derive the channel quality information;
wherein:
    the closed loop transmit gain adjustment for CPICH variance is calculated from complex channel estimates for a first antenna and a second antenna and complex antenna weight;
wherein:
    the closed loop transmit adjustment for CPICH variance $$\sigma_{CPICH\_Rake\_Adj} = \sigma_{CPICH\_Rake} \sum_k c^{-k}$$

is calculated, for each slot from k-th multipath output, according to $$c^{-k} = \frac{1}{10}\sum_n (\alpha_1^k(n)\alpha_1^{k*}(n) + \alpha_2^k(n)\alpha_2^{k*}(n)).$$

where
$\alpha_1^k(n)$ and $\alpha_2^k(n)$ denote complex channel estimates for the first antenna and the second antenna, and
$\alpha_1^{k*}(n)$ and $\alpha_2^{k*}(n)$ are complex conjugates of $\alpha_1^k(n)$ and $\alpha_2^k(n)$.

* * * * *